United States Patent Office 3,301,274
Patented Jan. 31, 1967

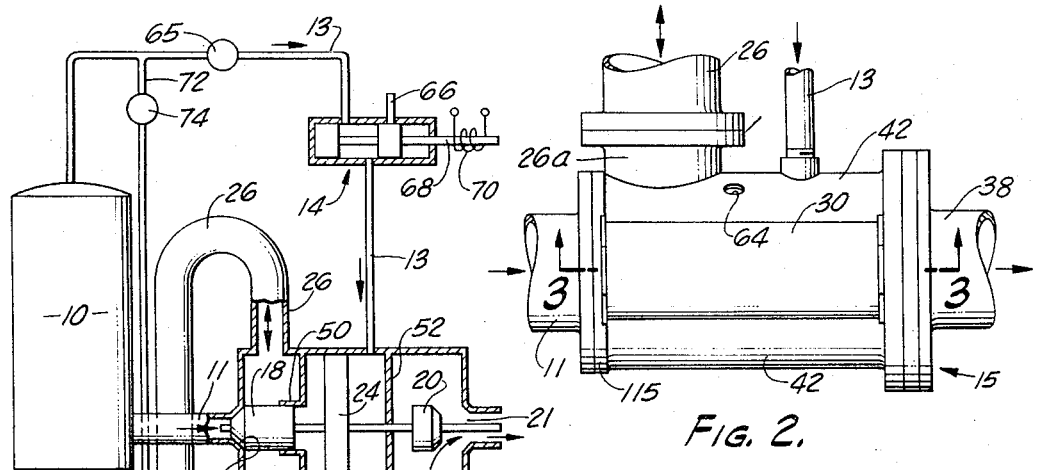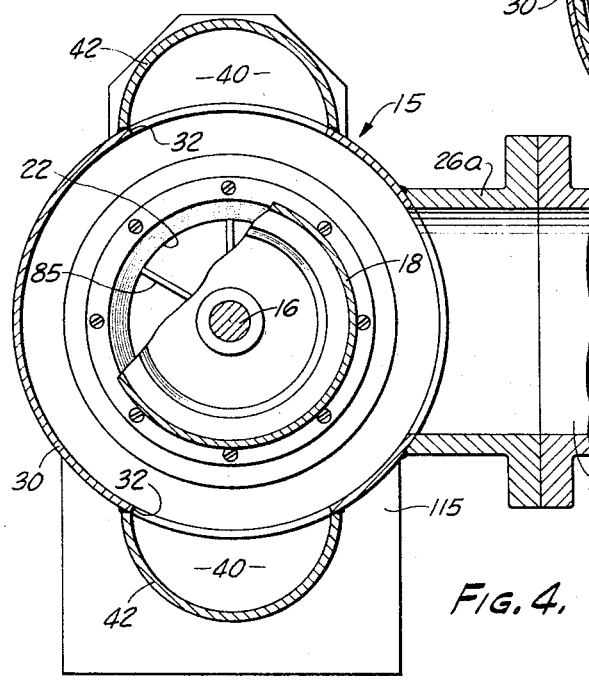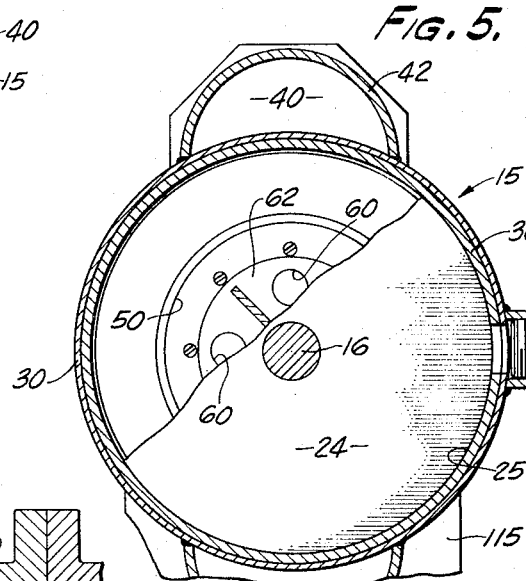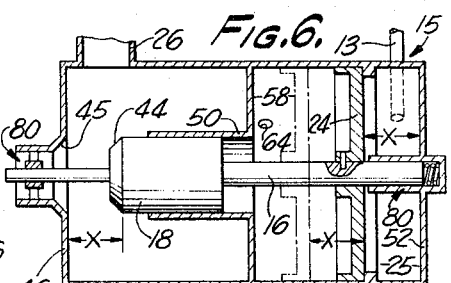

3,301,274
QUICK OPENING HIGH PRESSURE VALVE
James T. Kenney, Arcadia, Calif., assignor, by mesne assignments, to United Geophysical Corporation, Pasadena, Calif., a corporation of Delaware
Filed Jan. 23, 1964, Ser. No. 339,767
19 Claims. (Cl. 137—625.66)

This invention relates to valve structures, and more particularly concerns relatively large valves for handling large volumes of high pressure gases such as high pressure air employed for actuating various types of apparatus.

In employing high pressure air or other fluids for actuation and control of machinery of various kinds, it is often important that the controls be operated for short time intervals, for example, fractions of seconds, and it is therefore necessary, where valve structures are employed for control purposes, that such valves be capable of opening and closing very quickly so that the flow of large volumes of high pressure air may be initiated in large amounts almost instantaneously, and be sharply cut off after a short time interval.

It is therefore one object of this invention to provide a large valve structure for handling large volumes of high pressure air or other fluids quickly, such as in time intervals measured in terms of milliseconds.

An incidental object of the invention is to provide a quick acting high capacity valve structure which is actuable by the pressure of the high pressure air itself.

It is another object of the invention to provide large valve structures which may be quickly opened and closed and wherein the high pressure air itself may be employed to close the valve and retain the valve closed, and mere release or reduction of the air pressure thus applied may be effected whereby to permit the main body of the high pressure air to snap the valve open.

A further object of the invention is to provide a quick acting high pressure valve for handling large volumes of the high pressure air and the like wherein differential piston means ars employed to effect the opening and closing of the valve.

An additional object is to provide a quick-acting high-pressure-fluid valve wherein the high-pressure fluid serves to open the valve, pressure fluid acts on a differential piston to hold the valve closed, and pressure reduction on the differential piston provides for opening of the valve by the high-pressure fluid, whereby to avoid the necessity for using an additional applied triggering force to open the valve.

A still further object is to provide such a quick acting valve employing a differential piston actuable by reduction of pressure to open the valve, such piston working in a control chamber on a stroke limited to much less than the chamber length for reducing air compression therein on valve opening, whereby to avoid chatter.

Other objects of the invention and various features of construction thereof will become apparent to those skilled in this art upon reference to the following specification and accompanying drawings wherein there is illustrated an embodiment of the invention which presently is deemed as representing the best form of the invention.

In the drawings:

FIGURE 1 is a small scale diagrammatic showing of a system employing the quick acting valve of this invention;

FIG. 2 is an elevational view of the quick acting valve of this invention shown connected to supply high pressure air to actuate a machine, and quickly exhaust such air following operation;

Figure 3:
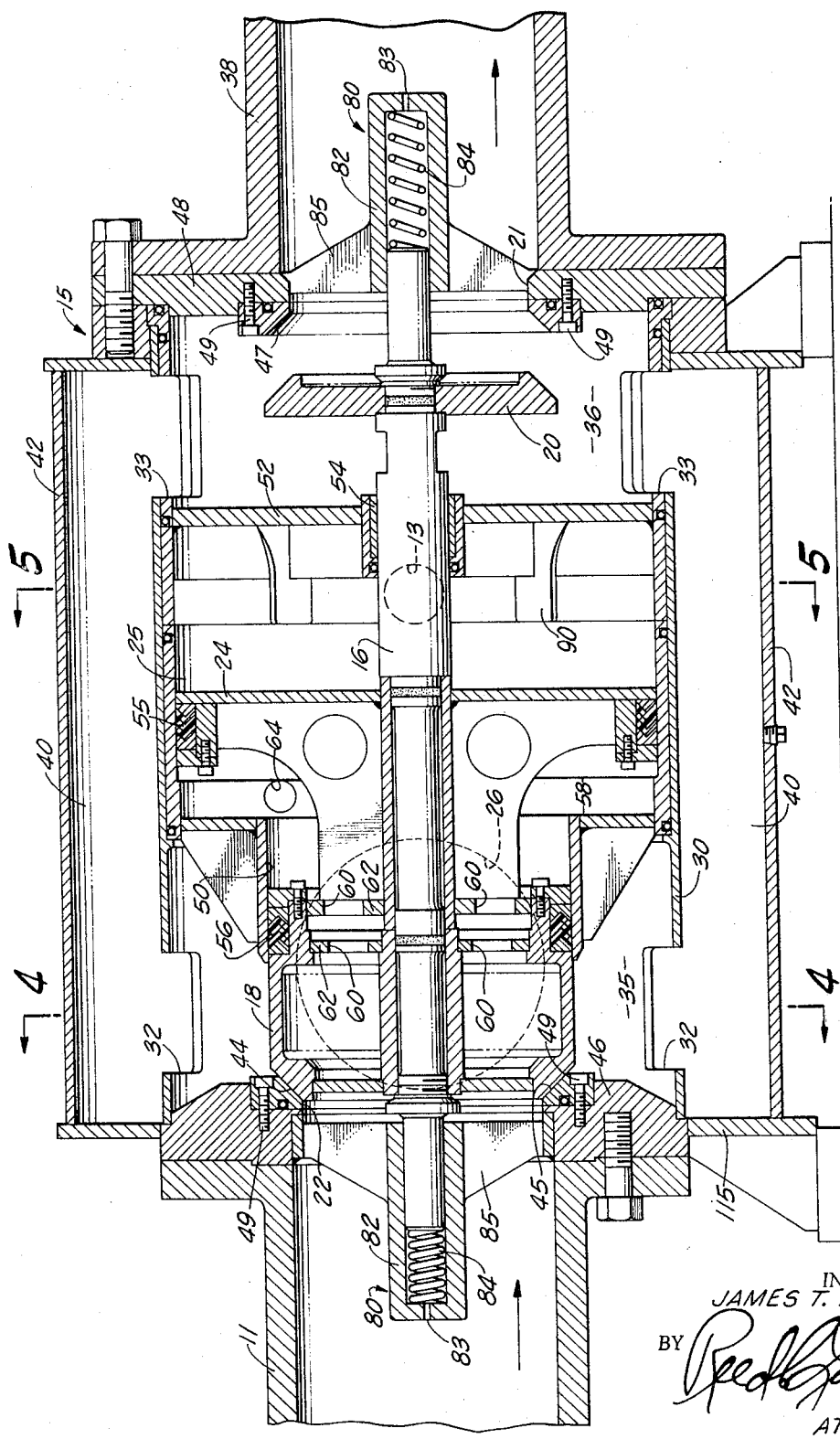
FIG. 3 is an enlarged longitudinal sectional view of the valve and is taken on the line 3—3 of FIG. 2.

FIGS. 4 and 5 are cross-sectional views on a somewhat reduced scale and taken on the lines 4—4 and 5—5 of FIG. 3; and FIG. 6 is a cross-sectional view showing a somewhat modified form of valve.

In the drawings, there is illustrated in FIG. 1 one system in which the quick acting valve of this invention is usable. Here there is shown a large air tank 10 for supplying air which is maintained under relatively high pressure, such as 150 or 160 p.s.i., together with a quick acting valve for supplying large volumes of such air via line 11 to a heavy impact machine 12 adapted to produce very powerful blows under the influence of that high pressure air. There is also shown a pilot line 13 leading to a solenoid controlled valve 14 used for actuation of the quick acting valve 15. The valve structure 15 is directly connected to the tank 10 by the line 11, which is a large high capacity air line.

The quick acting high capacity valve 15 of this invention is illustrated in detail in FIG. 3. Here the valve 15 is shown as including a housing 115 mounting a combined piston rod and valve stem 16 at whose left end (as illustrated) there is mounted a high pressure air inlet piston valve 18 and at whose opposite end there is mounted an air exhaust valve 20. The valve 20 controls a large exhaust or outlet port 21 in the housing 115 and the valve 18 controls an equally large inlet port 22. Mounted upon the valve stem 16 between the two valves 18 and 20 is a relatively large actuating differential piston 24 working in a cylindrical inner chamber 25. The underside of the piston 24 is energized by the pilot pressure from the pilot pressure line 13. When pressure in the chamber 25 is sufficiently reduced through the line 13 by the control of a solenoid of the solenoid valve 14, high pressure from the tank 10 via the line 11 working against the upper side of the inlet valve 18 opens the latter and closes the exhaust valve 20. High pressure air in large volume then passes through a large supply line 26 to actuate the machine 12. This machine 12, in the example indicated, may include a floating impact piston 27 working in a cylindrical housing 28 to impact an anvil 29 for imparting a powerful blow to any object desired, such as the top of a piece of piling, or the earth when conducting seismographic explorations.

The valve 15 includes a cylinder 30 disposed between the opposite ends of the housing 115. This cylinder 30 is ported to provide vent ports 32 adjacent the valve 18 and inlet port 22 to vent the line 26. It is also ported at 33 in its opposite end portion adjacent the outlet valve 20 for exhausting the spent air through the exhaust port 21. Thus, the machine 12 receives high pressure actuating air direct from the cylinder 30 through the supply line 26. Upon closing the inlet port 22 by the inlet piston valve 18, under control of the solenoid valve 14, as above described, the outlet valve 20 is simultaneously opened through the valve stem 16 to open the exhaust port 21. Thereupon the spent high pressure air passes from an air chamber 35 in the cylinder 30 adjacent the valve 18 by way of the ports 32 and down to the ports 33 into an underlying chamber 36 which houses the valve 20 and thence through the exhaust port 21 to an exhaust line 38 to the atmosphere. Means constituting conduits 40 leading from the cylinder ports 32 to the cylinder ports 33 are provided in the form of arcuate channels 42, at each side of the cylinder 30, welded in place between the two end walls of the housing 115, this relationship being especially indicated in FIG. 4. If preferred, only one such conduit 40 and channel 42 may be used as diagrammatically indicated in FIG. 1.

In connection with the actuation of the valves 18 and 20, the closing portion of the piston valve 18 is in the form of a beveled valve element 44 which cooperates with a beveled valve seat 45 carried on the end wall 46 of the housing 115. Similarly a beveled valve seat 47 is carried on an opposite end wall 48 of the housing 115 to receive the beveled valve 20. These beveled valve seats 45 and 47, in the form shown, are retained as by means of machine screws 49 in their operative positions for cooperation with the beveled faces of the valve parts 20 and 44.

As illustrated in FIG. 3, the beveled valve seats 45 and 47 face toward each other, so that, as the valves 20 and 44 are moved by the valve stem 16 and the valve actuating piston 24, each valve is closed simultaneously with the opening of the other valve.

These valve movements are effected through the medium of a pilot pressure supplied by the pilot pressure line 13 past th esolenoid controlled three-way actuating valve 14 in the line 13, previously mentioned. To effect these valve operations, the cylinder 30 houses the actuating piston 24 in the control chamber 25. The cylinder 30 also contains an inwardly stepped cylinder 50 in which the cylindrical portion of the valve piston 18 reciprocates in conjunction with the valve stem 16 and the larger area actuating piston 24. With this arrangement, the smaller area valve piston 18, which performs the function of a smaller piston, cooperates with the larger area piston 24 to constitute a differential piston set to perform the required operations.

The outlet end of the cylinder 30 contains a fixed cylinder head 52 provided with a central packing 54 to pass the combined valve stem and piston rod 16 for actuation of the outlet valve 20. To prevent high pressure air leakage, the piston 24 is packed against the cylinder wall at 55. Similarly, to prevent high pressure air leakage, the inner end of the piston 18 is packed at 56 in the inwardly stepped cylinder 50. Thus, there is provided in the cylinder 30 behind the piston 24 the actuating pressure chamber 25. Between the other side of the larger area piston 24 and the inner side of the piston 18 carrying the inlet valve 44, there is provided a low pressure chamber 58 which communicates with the interior of the cylindrical piston valve member 18 through the medium of apertures 60 in plates 62 which mount the piston 18 on the combined valve stem and piston rod 16. To provide the low pressure required in the chamber 58, this chamber is vented to the atmosphere through an appropriate port 64.

With the described differential piston construction, when the high pressure from the tank 10 is communicated through the high pressure line 11 to the inlet port 22, the inlet valve member 44 of the piston valve 18 will open (with the consequent closing of the outlet valve 20) unless and until an actuating pressure is applied to the actuating chamber 25 behind the larger area valve 24. By reason of the much larger area of the piston 24, a much lower actuating pressure may be developed in the actuating chamber 25 than the pressure from the tank 10 applied to the inlet valve member 44, in order to close the inlet valve 44 against the pressure in the high pressure inlet line 11. Consequently, by actuation of the solenoid valve 14 to the position illustrated in FIG. 1, pressure taken through the line 13 will promptly move the larger piston 24 to position causing the inlet valve member 44 to close the inlet port 22. Since considerably lower pressure is needed to move the actuating piston 24 to the inlet valve closing position, than the pressure in the tank 10, a suitable pressure reducing valve 65 may be used in the line 13 if desired.

When it is desired to actuate the machine 28, or other apparatus, by high pressure through the feed line 11 from the tank 10, the solenoid valve 14 is shifted to its opposite position from that illustrated in FIG. 1 so as to exhaust the pressure in the actuating chamber 25, or at least reduce it to a lower or negative pressure such that the high actuating pressure of the air tank 10 will cause opening of the valve member 44 at the inlet port 22. An exhaust line 66 from the three-way valve 14 indicated in FIG. 1 serves for exhaust of the actuating pressure in the chamber 25 when the valve plunger 68 is moved to the exhaust position.

By reason of the beveled construction of the inlet valve part 44 and its cooperating seat 45, as soon as the piston valve 18 commences to open the effective area of such piston valve is immediately greatly increased. As a result the valve member 44 is suddenly snapped open and the outlet valve member 20 is suddenly closed, thereby suddenly transmitting the high pressure air from the tank 10 in large volume through the supply line 26 to the machine 12 or other apparatus to be actuated. A suitable control connected with the solenoid 70 of the valve 14 will, in the case of a machine like the impactor machine 12, suddenly shift the valve plunger back to the position of FIG. 1, thereby quickly moving the actuating piston 24 to position the inlet valve member 44 in closing position.

Such quick actions are required for valves used in connection with devices of the general type of the machine 12. In such a case, for example, the impacting piston 27 is suddenly driven downward by the sudden application of the high pressure air volume to impact the anvil 29 which effects the powerful blow required. In such a case, immediate release of the high actuating pressure is required for various reasons, such as the control of rebound and the like. The present valve structure meets these requirements, the indicated controls such as the valve 14 and the solenoid 70 serving to effect valve actuation.

When the valve of this invention is employed with an impacting unit 12 that is used for driving piles or for striking the earth to generate seismic waves, the anvil 29 is rested on the pile or the earth, as the case may be, and the cylindrical housing 28 is lowered by gravity relative to the anvil in order that the anvil is lifted off the bottom of the cylindrical housing, thus enabling it to impart its full blow directly to the pile or the earth, as the case may be. In addition low pressure air is introduced through a pipe 72 including a pressure reducer 74 into the space between the anvil and the piston 27 in order to provide the desired floating action. This pressure is slightly above atmospheric, and is very low compared with the pressure of the high pressure air that is introduced into the impacting unit 12 through the quick acting valve 15. An impacting unit and a complete system utilizing the valve 15 for operating the impacting unit 12 is disclosed and claimed in copending patent applications Serial No. 306,795 and Serial No. 311,486.

Inasmuch as both the opening and the closing actuation of the valve stem 16 and its valve members 20 and 44 tend to impart sharp blows at the valve seats 45 and 47, it is very desirable to incorporate with the valve structure means for snubbing or cushioning the action of the valve stem and its valves at the ends of the respective operations. For this purpose, a snubber 80 is provided for each end of the combined rod and valve stem 16. In the form disclosed each of the snubbers 80 includes a dash pot 82 with a small vent 83, and an appropriately tensioned spring 84 bearing between the end of the respective dash pot and the respective end of the valve stem 16. The shock of the opening and closing of the valves is partially absorbed by these snubbers or shock absorbers 80. With the structure illustrated, in a case where the stroke may approximate an inch and one-half, the last quarter inch of the stroke is so effectively cushioned that a great portion of the shock is absorbed so as adequately to protect the valve structure. At the same time the effective opening and closing of the valves is not significantly delayed. The mounting of these snubbers 80 is conveniently effected through the medium of spiders 85 which span the outlet and inlet openings 21 and 22 between the dash pots 82 and the respective end walls 46 and 48 of the housing 115. The spiders 85 may be either formed integrally as indicated in connection with the end wall 48 or welded in place as indicated in connection with the end wall 46.

Another important aspect of valve and piston action involves the limitation of the above mentioned stroke with respect to the capacity of the control chamber 25 to avoid valve oscillation and chatter. This limitation is accomplished by limiting the movement of the larger piston 24 of the differential pistons to only about 33% to about 67% of the axial depth, or length, of the chamber 25, measured when the valve 18 is closed. The length $x$ of the stroke is indicated in FIG. 6. In other words, with the above mentioned stroke of about 1½ inches, the total depth of the chamber 25 may approximate about 4 inches or a little less such as down to about 3 inches. This limitation of stroke prevents excessive compression of the air in the control chamber 25 when the valve 18 is snapped to open position, as previously described. The limitation of the compression precludes oscillation or chatter that might otherwise occur.

The limitation of the stroke may be effected in several ways. In the form of FIG. 3, for example, the engagement of the valve 20 with its seat 47, when the valve 18 opens, limits the stroke. Also the end wall of cylinder head 52 of the chamber member 30 may be provided with outstanding webs 90 which span portions of the chamber 25 and serve at their inward ends as a seat or stop for the piston 24. In the case of the modified structure shown in FIG. 6, an annular stop ring 92 is anchored in position within the cylinder 30 to limit the opening movement of the piston 24 and consequently of the valve piston 18 and the valve stem 16. One reason why only about 33% to about 67% of the depth of the control chamber 25 is to be traversed by the piston 24 is that since the flow rate in the pilot pressure line 13 is so small with respect to the capacity of the control chamber 25 and the speed of movement of the piston 24 that when the inlet valve 18 snaps open, compression of the air remaining in the chamber 25 occurs very rapidly and without any substantial loss of air through the pilot pressure line. Otherwise expressed, with respect to the sudden opening of the valve 18 and corresponding movement of the piston 24 as the opening snap action occurs, the general effect is approximately the same as though the port to the line 13 were momentarily non-existent, that is, closed. On the other hand, if the reduced or compressed volume of the chamber 25 were very small, it would be subject to high adiabatic compression, and such compression could become so great that there would be a tendency for the piston 24 to immediately return the valve 18 toward closed position. Objectionable and even destructive oscillation and chatter could result. By limiting the travel of the piston 24 to around one-third to two-thirds of the total axial depth of the chamber 25, serious oscillation and chatter are overcome.

As illustrated in FIG. 3, the stroke of the piston 24 approximates one-third of the axial length of the chamber 25. In FIG. 6, the stroke is illustrated as approximating one-half the length of the chamber 25. It will be noted further that the capacity of the stepped low pressure chamber 58 approximates the total capacity of the chamber 25 when the piston 24 is in position for closing the inlet valve 18, as illustrated in FIG. 3.

The showing of FIG. 6 serves also to indicate the application of the present improvements of a valve body 15 wherein the exhaust outlet 58 and the exhaust valve 20, as employed in FIG. 3, are omitted, the valve 18 controlling merely the air inlet 45 and the passage of high-pressure high-volume air to the large supply line 26 that leads to loads (not shown) that have their own exhausts, thus not requiring the use of an exhaust valve 20 in the valve structure. Thus, the structure of FIG. 6 employs the cylinder 30, the inlet wall 46, and the cylinder head 52 at the opposite end of the cylinder 30. Here, the cylinder head 52 is imperforate except for the orifice leading to the pilot pressure line 13 and carries the respective snubber 80 for the end of the piston rod and valve 16. The same larger piston 24 of the differential piston unit is employed in the same pilot pressure control chamber 25, and the same vented chamber 58 at the opposite side of the piston 24 is used communicating with the interior of the same valve piston 18 operating in the same stepped cylinder 50. Again the chamber 58 is vented to the atmosphere through an appropriate port 64 as in the structure of FIG. 3. The resistance that this port offers to gas flow is much lower than the resistance of the line 13 so that, for some purposes, the pressure in the chamber may be treated the same as atmospheric.

Pilot pressure is supplied to the control chamber 25 through the pilot pressure line 13 which may be controlled by the valve 14 of FIG. 1 as previously described. As above stated, the stroke of the piston 24 in FIG. 6 is limited by the stop ring 92, and the amount of the stroke of the piston 24, and hence of the valve stem 16 and of the valve 18 and its valve element 44, approximately one-half the axial depth of the chamber 25 measured when the piston 24 is in valve-closing position. It is to be noted that in practice the total length of the control chamber when compressed is several times greater than the diameter of the orifice that establishes communication between the control chamber and the pilot-pressure line 13.

The prevention of oscillation is assured if the force applied from the high pressure line to the small piston 18 when the valve is open is greater than the force applied to the piston 24 in the opposite direction by the gas in the control chamber at that time, taking due account of the fact that the pressure in the chamber 58 is also acting differentially on the two pistons 18 and 24. It can be shown that the required relation of pressures is attained provided that the ratio S of the volume of the control chamber when the valve is open to the volume of the chamber when the valve is closed is greater than a critical value C that is given by the equation $$C_1 = \left(\frac{P_2 A}{P_1 a + M(A-a)}\right)^{\frac{1}{\gamma}}$$

where $a$ = cross-sectional area of small piston
$A$ = cross-sectional area of large piston
$P_1$ = pressure of fluid controlled
$P_2$ = release pressure of control chamber
$M$ = atmospheric pressure
$\gamma$ = ratio of specific heats of gas in control chamber This relationship holds so long as the pressure in the chamber 58 is atmospheric. In fact, however, since the chamber 58 is confined except for the vent 64 the pressure in that chamber falls somewhat when the valve is snapped open. Though that pressure can never fall to zero a safety factor is introduced by assuming that that pressure can fall to zero and choosing the critical ratio C in accordance with the formula $$C_2 = \left(\frac{P_2 A}{P_1 a}\right)^{\frac{1}{\gamma}}$$

In practice also it should be borne in mind that the release pressure which exists in the control chamber at the time that the valve snaps open is approximately equal to atmospheric pressure. For this reason an even safer critical limit that may be applicable under extreme conditions is given by the equation $$C_3 = \left(\frac{MA}{P_1 a}\right)^{\frac{1}{\gamma}}$$

In all cases, in practice the ratio S is made substantially greater than $C_1$. In the present design this is achieved by setting the stroke of the piston to between about 33% and about 67% of the length of the cylinder.

It is thus seen that this invention makes it possible to control the flow of gas at high pressure to a utility line without excessive valve oscillation or chatter and that it also makes possible the supply and withdrawal of gas at high pressure to a working chamber that contains an impact piston or other working piston. Although only two particular forms of the invention have been specifically illustrated and described, it will be obvious that the invention is not limited thereto but is capable of being embodied in many other forms within the scope of the appended claims.

The invention claimed is:

1. In a quick-acting differential valve structure for controlling flow of high-pressure large-volume fluids:
   a valve body providing a fluid chamber having an axis;
   means providing a fluid inlet port on said axis to said chamber;
   means providing a fluid exhaust port on said axis from said chamber;
   valve seats provided on said valve body about said ports;
   a valve stem disposed along said axis and carrying valves adjacent its opposite ends for engaging said seats and controlling said ports;
   said valve body providing a high pressure fluid outlet passage from said chamber; and
   differential pistons mounted on said valve stem between said valves for actuating said valves to open one valve and close the other simultaneously.

2. A structure as in claim 1 wherein said valve body includes a stepped cylinder for the differential pistons providing differential pressure chamber; and
   a pilot pressure line connected to apply fluid pressure upon the piston of greater area to close the inlet valve.

3. A structure as in claim 1 wherein said valve body includes a cylinder member ported at its ends adjacent said valves, and means connected adjacent said cylinder ports for by-passing fluid between said valve ports and around the differential pistons.

4. A structure as in claim 3 wherein said cylinder member contains a stepped cylinder portion, the cylinder member and stepped cylinder portion providing a first cylinder housing the differential piston of smaller diameter and a second cylinder for the larger diameter piston.

5. A structure as in claim 4 wherein a pilot pressure fluid line connects to the cylinder of larger diameter to control the piston of larger diameter.

6. A structure is in claim 5 wherein the first cylinder has a vent.

7. A structure as in claim 2 including means to supply high pressure fluid to said inlet port, and means to reduce pressure in said pilot pressure line for opening of said inlet valve by the high pressure fluid.

8. In a quick-acting valve structure for controlling flow or high pressure large-volume fluids:
   a valve body providing a fluid chamber having an axis;
   means providing an inlet port to said chamber at said axis;
   means providing an outlet port from said chamber at said axis;
   valve seats provided on said valve body about said ports;
   a valve stem disposed along said axis and carrying valve members adjacent its opposite ends for engagement with said seats to control said ports;
   said valve body including a first cylinder and a concentric stepped cylinder therewithin providing a smaller cylinder portion;
   a piston on said valve stem and connected to one of said valve members and having such one valve member as an end of such piston, such piston working in said smaller cylinder portion; and
   a larger piston working in said first cylinder and mounted on said valve stem and providing a control chamber on one side of said larger piston and a stepped chamber on the other side thereof.

9. A valve structure as in claim 8 wherein a pilot pressure line leads to said control chamber for effecting movements of said pistons through said larger piston.

10. A valve structure as in claim 8 wherein said valve seats face inward toward said chambers and said valve members are disposed on said valve stem to close one of said ports as the other opens.

11. A valve structure as in claim 8 wherein said first cylinder is ported adjacent both valve members and conduit means connect such cylinder ports.

12. A valve structure as in claim 10 wherein a pilot pressure line is connected to said control chamber to actuate said larger piston, said first cylinder is ported adjacent both valve members, conduit means connect such cylinder ports, and a fluid transfer passage leads between said fluid chamber and a device to be actuated by said high-pressure fluid, whereby high-pressure fluid is passed to said device upon opening of said inlet port through opening actuation of said larger piston and said high-pressure fluid returns to said fluid chamber and passes to said exhaust port by way of said conduit means upon opposite actuation of said larger piston to close the inlet port.

13. In a quick-acting differential valve structure for controlling flow of high-pressure large-volume fluids:
   a valve body providing a fluid chamber having an axis;
   means providing a fluid inlet port on said axis to said chamber;
   means providing a fluid exhaust port on said axis from said chamber;
   a valve stem disposed along said axis and carrying valves adjacent its opposite ends for controlling said ports;
   said valve body providing a high pressure fluid outlet passage from said chamber; and
   a differential piston mounted on said valve stem for actuation of said valves to open one valve and close the other simultaneously.

14. In a quick-acting valve structure for controlling the flow of high pressure fluids:
   a valve body providing a fluid chamber having an operating axis;
   means providing a fluid inlet port on said axis to supply said chamber;
   means providing a fluid exhaust port on said axis to exhaust said chamber;
   a valve stem disposed along said axis and carrying valve members adjacent its ends controlling said ports;
   valve seats at said ports respectively facing inward toward said chamber;
   means on said valve stem between said valve members for controlling movement of said valve members for closing one and opening the other simultaneously; and
   snubber means connected with said valve body outside both ports and receiving the ends of the valve stem to cushion closing of said valve members.

15. A structure as in claim 14 wherein said snubber means include:
   a dash-pot receiving the respective valve stem end;
   a spring in said dash-pot engaging the stem end; and
   spider means positioning the dash-pot on said valve body.

16. In a quick-acting valve structure for controlling the flow of fluids from a high pressure line:
   a valve unit having a fluid chamber and a control chamber on a valve operating axis;
   means providing a fluid inlet port on said axis to supply fluid to said fluid chamber from a high pressure line;
   a valve stem disposed along said axis and having thereon a valve head for closing said port;
   differential pistons mounted on said stem within said respective chambers for actuating said stem and valve head;

said fluid chamber comprising a first cylinder of smaller diameter in which the smaller of said differential pistons is disposed, said control chamber comprising a second cylinder of larger diameter in which the larger of said pistons is disposed;

means defining a low pressure zone between said pistons and vented to the atmosphere;

a port in said control chamber for connection to a pilot pressure line for pressurizing said control chamber to close said valve and releasing said pressure to open said valve;

and means limiting the stroke of said valve, said valve stem and said pistons to a stroke length such that the ratio S of the volume of the control chamber when said valve is open to the volume thereof when said valve is closed, is substantially greater than C where $$C = \left(\frac{P_2 A}{P_1 a + M(A-a)}\right)^{\frac{1}{\gamma}}$$

where $a$ = cross-sectional area of small piston
$A$ = cross-sectional area of large piston
$P_1$ = pressure of fluid controlled
$P_2$ = release pressure of control chamber
$M$ = atmospheric pressure
$\gamma$ = ratio of specific heats of gas in control chamber.

17. In a quick-acting valve structure for controlling the flow of high pressure fluids without valve chatter:

a valve body providing a fluid chamber and having a valve operating axis;

means providing a fluid inlet port on said axis to supply said chamber;

a valve stem disposed along said axis and having thereon a valve for closing said port;

differential pistons mounted on said stem within said body for actuating said stem and valve;

said valve body including a stepped cylinder member having a first cylinder of smaller diameter in which the smaller of said differential pistons is disposed and a second cylinder of larger diameter in which the larger of said pistons is disposed;

a vented chamber located in said stepped cylinder between said pistons and vented to the atmosphere and a larger chamber on the opposite side of said larger piston and constituting a control chamber;

a pilot pressure line leading to said control chamber to pressurize said control chamber and to release said pressure;

and means limiting the stroke of said valve, said valve stem and said pistons to a stroke length within about 33% to about 66% of the axial length of said control chamber when said larger piston is in valve-closing position, whereby to limit building up of pressure in said control chamber when said pilot pressure is reduced for the high pressure on said valve to snap said valve suddenly open and move said larger piston in said control chamber.

18. A structure as in claim 17 wherein said valve is beveled and has a beveled valve seat proving for snap opening of said valve.

19. A structure as in claim 17 wherein said pilot pressure line is provided with means for supplying a pilot pressure to said control chamber less than the pressure applied to open said valve.

References Cited by the Examiner
UNITED STATES PATENTS

| | | | |
|---|---|---|---|
| 197,037 | 11/1877 | Magnus | 251—43 |
| 785,646 | 3/1905 | Westbrook | 137—625.66 |
| 2,591,118 | 4/1952 | Bent | 137—625.25 X |

M. CARY NELSON, *Primary Examiner.*

A. ROSENTHAL, *Assistant Examiner.*